United States Patent
Ben Amor

(10) Patent No.: US 9,266,173 B2
(45) Date of Patent: Feb. 23, 2016

(54) MILLING CUTTER FOR HARD MACHINING

(75) Inventor: Raouf Ben Amor, Lorch (DE)

(73) Assignee: CeramTec GmbH, Plochingen (DE)

( * ) Notice: Subject to any disclaimer, the term of this patent is extended or adjusted under 35 U.S.C. 154(b) by 111 days.

(21) Appl. No.: 13/982,090

(22) PCT Filed: Feb. 28, 2012

(86) PCT No.: PCT/EP2012/053313
§ 371 (c)(1),
(2), (4) Date: Aug. 13, 2013

(87) PCT Pub. No.: WO2012/116969
PCT Pub. Date: Sep. 7, 2012

(65) Prior Publication Data
US 2013/0315680 A1    Nov. 28, 2013

(30) Foreign Application Priority Data
Feb. 28, 2011    (DE) .......................... 10 2011 004 855

(51) Int. Cl.
B23C 5/10    (2006.01)

(52) U.S. Cl.
CPC ............. B23C 5/1081 (2013.01); B23C 5/1009 (2013.01); *B23C 2210/02* (2013.01); *B23C 2210/03* (2013.01); *B23C 2210/203* (2013.01); *B23C 2210/205* (2013.01); *B23C 2210/207* (2013.01); *B23C 2210/208* (2013.01); *B23C 2210/209* (2013.01); *B23C 2226/125* (2013.01); *B23C 2226/315* (2013.01); *B23C 2240/08* (2013.01); *B23C 2240/32* (2013.01);

(Continued)

(58) Field of Classification Search
CPC ............ B23C 2222/28; B23C 2226/12; B23C 2226/125; B23C 2226/315; B23C 2240/08; B23C 2240/16; B23C 2240/24; B23C 2240/32
USPC ........................................ 407/53, 33
See application file for complete search history.

(56) References Cited

U.S. PATENT DOCUMENTS 3,994,615 A * 11/1976 Narang .................. 408/226
5,070,748 A * 12/1991 Packer .................. 76/108.6
(Continued)

FOREIGN PATENT DOCUMENTS

DE    2246965 A * 4/1974
DE    93 03 053 U1    4/1994
(Continued)

OTHER PUBLICATIONS

Machine Translation of JP 8-336716. pp. 1-5, Apr. 1, 2015.*
(Continued)

*Primary Examiner* — Daniel Howell
*Assistant Examiner* — Nicole N Ramos
(74) *Attorney, Agent, or Firm* — Norton Rose Fulbright US LLP

(57) ABSTRACT

The invention relates to a milling tool (1) having a length $l_{total}$ and diameter $d_{total}$ and having blades (2) for the milling of mostly metal workpieces. In order to prevent an uncontrolled failure of the milling tool, it is proposed that the blades (2) are partially or entirely made of polycrystalline cubic boron nitride (PcBN) or polycrystalline diamond (PCD) and the diameter $d_{total}$ of the milling tool lies between 7 mm and 40 mm.

14 Claims, 4 Drawing Sheets

(52) U.S. Cl.
CPC ...... *Y10T407/1904* (2015.01); *Y10T 407/1906* (2015.01); *Y10T 407/1946* (2015.01)

(56) References Cited

U.S. PATENT DOCUMENTS

| | | | |
|---|---|---|---|
| 5,115,697 A * | 5/1992 | Rodriguez et al. | 76/108.6 |
| 5,899,642 A * | 5/1999 | Berglow et al. | 407/40 |
| 6,152,657 A | 11/2000 | Packer et al. | |
| 6,652,201 B2 | 11/2003 | Kunimori et al. | |
| 7,153,066 B2 * | 12/2006 | Schafer et al. | 407/30 |
| 7,374,376 B2 * | 5/2008 | Jonsson et al. | 408/233 |
| 7,559,382 B2 * | 7/2009 | Koch | 175/420.1 |
| 8,534,963 B2 | 9/2013 | Luik | |
| 2001/0031177 A1 | 10/2001 | Nagaya et al. | |
| 2003/0039523 A1 * | 2/2003 | Kemmer | 408/231 |
| 2004/0120777 A1 | 6/2004 | Noland | |
| 2007/0172321 A1 * | 7/2007 | Nagai | 407/53 |
| 2009/0245946 A1 | 10/2009 | Maeda | |
| 2010/0296881 A1 | 11/2010 | Huang | |

FOREIGN PATENT DOCUMENTS

| | | | |
|---|---|---|---|
| DE | 199 46 799 A1 | | 4/2001 |
| EP | 776719 A1 | * | 6/1997 |
| EP | 1 048 382 A2 | | 11/2000 |
| EP | 1 125 667 A2 | | 8/2001 |
| EP | 2 266 739 A1 | | 12/2010 |
| FR | 2531887 A1 | * | 2/1984 |
| FR | 2 929 869 A1 | | 10/2009 |
| JP | 08336716 A | * | 12/1996 |
| JP | 2005-118960 A | | 5/2005 |
| JP | 2009034792 A | * | 2/2009 |
| WO | 2010/012367 A1 | | 2/2010 |
| WO | 2011/006804 A2 | | 1/2011 |

OTHER PUBLICATIONS

Machine Translation of DE 22 46 965. pp. 1-9, Apr. 1, 2015.*
Franken Machining technology Tool Catalogue 226 Milling Tools for the Die and Mould Industry, Franken GmbH & Co. KG, Germany, (2004).

* cited by examiner

MILLING CUTTER FOR HARD MACHINING

This application is a §371 of International Application No. PCT/EP2012/053313 filed Feb. 28, 2012, and claims priority from German Patent Application No. 10 2011 004 855.3 filed Feb. 28, 2011.

FIELD OF THE INVENTION

The invention relates to a milling tool having a length $l_{total}$ and diameter $d_{total}$ and having blades for the milling of mostly metal workpieces.

BACKGROUND OF THE INVENTION

Milling tools of this kind are used for machining ball races for the bearing industry, gear and drive technology, mold making and for general mechanical engineering.

As a rule, a ball race is produced by means of a milling process in the soft state, heat treatment and a milling process in the hard state. When milling, the cutting speed in the center of the ball race or in the region of the axis of rotation of the cutting part or milling cutter is zero, i.e. vc=0 m/min. So-called ball nose milling cutters are used.

The machining conditions in this region are undefined. Reforming and forging processes dominate and can lead to high undefined loading of the blades on the cutting part.

Particularly when milling hardened materials using extremely hard cutting agents such as cBN and PcBN, these loads can lead to uncontrolled failure of the tools.

OBJECT OF THE INVENTION the invention is based on the object of developing a milling tool, in particular a ball nose milling cutter, such that an uncontrolled failure of the milling tool is prevented.

SUMMARY OF THE INVENTION

According to the invention, this object is achieved by a milling tool as described herein.

BRIEF DESCRIPTION OF THE FIGURES

FIG. 1b shows a longitudinal section through a cutting part which is designed identically to the cutting part in FIG. 1a.
FIG. 1c shows a longitudinal section through a base body which is designed identically to the base body in FIG. 1a.

DETAILED DESCRIPTION

Figure 1A:
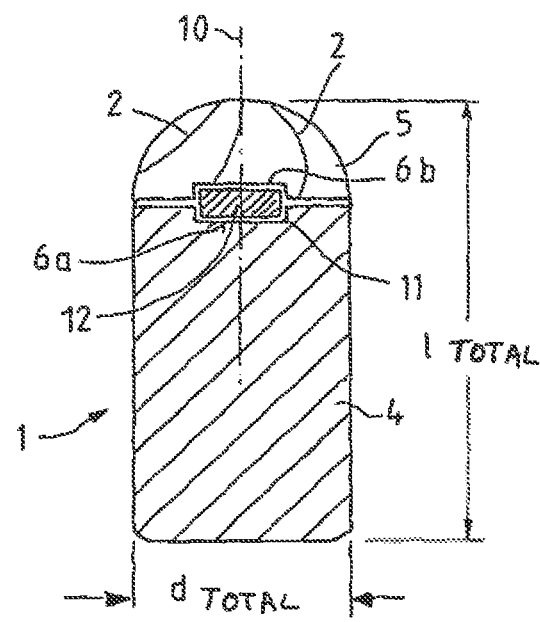
FIG. 1a shows a milling tool in longitudinal section.

As the blades are partially or entirely made of polycrystalline cubic boron nitride (PcBN) or polycrystalline diamond (PCD) and the diameter $d_{total}$ of the milling tool lies between 7 mm and 40 mm, the risk of fracture is low and breakage of the milling tool is eliminated, as a result of which an uncontrolled failure of the milling tool is prevented.

In a preferred embodiment, at least one of the blades is retracted or recessed in the center or at the pole. Alternatively, all blades are retracted or recessed in the center or at the pole. "Center or at the pole" is understood to mean the axis of rotation. It has been found that, as a rule, the milling tool or ball does not make contact with the ball race in the center or at the pole, i.e. in the central region of the path. The ball is supported over a certain angle by the edges of the race. This region is accordingly not functionally relevant and the load on the milling tool in this region is relieved by retracting or recessing.

In an embodiment of the milling tool according to the invention, the blades are brazed to the milling tool. As a result, it is possible to make only the blades from an extremely hard material, such as polycrystalline cubic boron nitride (PcBN) or polycrystalline diamond (PCD), and the rest of the milling tool from a less hard material.

In a preferred alternative embodiment, the milling tool is formed as one part and, including the blades, is made entirely of PcBN or PCD. Both are extremely hard materials which are particularly well suited.

In an inventive embodiment, the milling tool is formed in several parts with a base body and a cutting part, wherein the base body carries the cutting part directly or by means of an intermediate piece, the cutting part is designed in a hemispherical or distorted hemispherical shape, and the blades are formed in one piece with the cutting part or are brazed to the cutting part. This embodiment has the advantage that it is possible to make only the cutting part from polycrystalline cubic boron nitride (PcBN) or polycrystalline diamond (PCD). As the cutting part is designed in a hemispherical or distorted hemispherical shape, the two most important applications are covered. The cutting part which is designed with a distorted hemispherical shape (see FIG. 4a) produces a channel with a defined form and defined dimensions. This channel in the center of the ball race constitutes a depression which prevents material from being removed in this region during hard milling. As a result, chips are only formed in areas in which a sufficiently high cutting speed prevails, which guarantees a defined and therefore calculable formation of chips.

The cutting part can be joined to the base body in different ways.

Preferably, the cutting part is joined to the base body by positive interlocking. This optimizes the fixing, and the cutting part or milling cutter cannot be broken away from the base body during use. The positive interlocking can be achieved by different means.

A variant is characterized in that a recess is in each case arranged on the bottom of the cutting part which faces the base body and on the top of the base body which faces the cutting part, wherein said recesses are arranged in line with one another with respect to the longitudinal axis and, in the assembled state of the cutting part on the base body, form a mounting space in which a driving dog is brazed. In this embodiment, the driving dog is a separate component.

An alternative variant is characterized in that at least one raised driving dog is arranged on the bottom of the cutting part which faces the base body and at least one driving dog depression/driving dog depressions which is/are matched to the driving dog or driving dogs or vice versa is/are arranged on the top of the base body which faces the cutting part and, in the assembled state of the cutting part on the base body, the driving dog or driving dogs engages/engage in the driving dog depression/driving dog depressions and is/are preferably brazed therein. A separate driving dog is not necessary with this embodiment. The driving dog or driving dogs are integrated in the cutting part or base body respectively.

An embodiment is characterized in that an intermediate piece, which is joined to the base body and to the cutting part by positive interlocking, is arranged between the cutting part and the base body.

Preferably, on its underside which faces the base body, the intermediate piece has a thread or dovetail by means of which it engages in a matched recess in the base body or vice versa by positive interlocking. This form of fixing is simple and does not require brazing.

Preferably, the relationship of the axial length (l) and the diameter (d) of the cutting part to one another is such that l>d/2. This prevents breakage of the cutting part.

A preferred embodiment is characterized in that the relationship of the axial length ($l_{total}$) and the diameter ($d_{total}$) of the milling tool to one another is such that $l_{total}/d_{total}>2$.

Preferably, with a diameter (d) of the cutting part of

| | |
|---|---|
| 7 mm <= d <= 14 mm | 4 to 8 blades |
| 15 mm <= d <= 20 mm | 6 to 12 blades |
| 21 mm <= d <= 30 mm | 8 to 18 blades |
| 31 mm <= d <= 40 mm | 10 to 24 blades | are arranged on the cutting part.

In order to increase the safety of the hard milling process, a special geometry of the milling cutter is proposed for soft machining. This special geometry produces a channel with defined form and defined dimensions. This channel in the center of the ball race constitutes a depression which prevents material from being removed in this region during hard milling. As a result, chips are only formed in areas in which a sufficiently high cutting speed prevails, which guarantees a defined and therefore calculable formation of chips.

One cutting part, also referred to as a milling cutter, is used for soft machining. A different cutting part is provided for hard machining.

The cutting part for soft machining can be produced by an elliptical geometry. A raised tip in the center is also conceivable. Two cutting parts which are mounted inside one another can also contribute to the solution.

The missing blades in the region of the axes of symmetry of the milling cutter for hard machining open up new possibilities of tool design. A milling tool made of solid PcBN or coated PcBN blades with recessed blades in the region of the central axis can be used. According to the invention, a tool having an increased number of blades is produced, wherein the blades must not cross one another in the central region. First and foremost, by using solid PcBN for the cutting part, the number of blades for a diameter range d=20 mm can be increased from today's usual 3 to 4 blades to up to 6 to 12 blades. Among other things, the invention describes cutting parts:

1—Made from solid PcBN (i.e. the whole cutting part is made of ceramic) with recessed blades in the center and a diameter between d=7 mm and d=40 mm. Here, the number of blades is between 4 and 24 depending on the diameter. The PcBN cutting part is joined to ceramic or metal parts by means of a recessed or raised positive interlock and a hard brazing process in vacuum or under inert gas. Preferably, carbide metal is used for this purpose.

2—Made from solid PcBN blades which are recessed in the center and have a diameter between d=7 mm and d=40 mm. Here, the number of blades is between 4 and 24 depending on the diameter. The PcBN plates are joined to ceramic or metal parts by means of a recessed positive interlock and a hard brazing process in vacuum or under inert gas. Preferably, carbide metal is used for this purpose.

3—Made from brazed PcBN blades which are recessed in the center and have a diameter between d=7 mm and d=40 mm. Here, the number of blades is up to 24 depending on the diameter. The PcBN plates are joined to ceramic or metal parts by means of a recessed positive interlock and a hard brazing process in vacuum or under inert gas. Preferably, carbide metal is used for this purpose.

The invention is described in more detail below with reference to 4 figures.

FIG. 1a shows a milling tool 1 in longitudinal section comprising a base body 4 and a hemispherical cutting part 5, on which blades 2 are arranged, which is brazed to the base body 4. The milling tool 1 is deployed for use in a milling machine (not shown). The milling tool has a length $l_{total}$ and a diameter $d_{total}$. The base body 4 and the cutting part 5 are cylindrical. The base body 4 is made of a carbide metal or a ceramic.

The cutting part 5 is made entirely of a polycrystalline cubic boron nitride (PcBN) or polycrystalline diamond (PCD). The cutting part 5 has the same diameter $d_{total}$ as the base body 4. This diameter lies between 7 mm and 40 mm. The blades 2 are formed in one piece with the cutting part 5. The blades 2 can, however, also be brazed onto the cutting part 5.

In order to fix the cutting part 5 to the base body 4 by positive interlocking, a recess 6a, 6b is in each case arranged on the bottom of the cutting part 5 which faces the base body 4 and on the top of the base body 4 which faces the cutting part 5, wherein said recesses are arranged in line with one another and, in the assembled state of the cutting part 5 on the base body 4, form a mounting space 11 in which a driving dog 12 is brazed. The driving dog 12 and the brazing filler metal completely fill the mounting space 12.

Figure 1B:
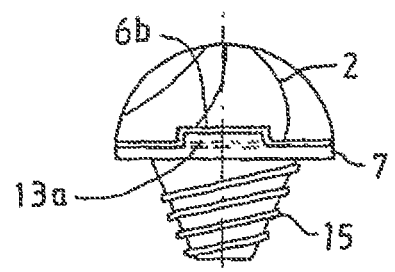
Figure 1C:
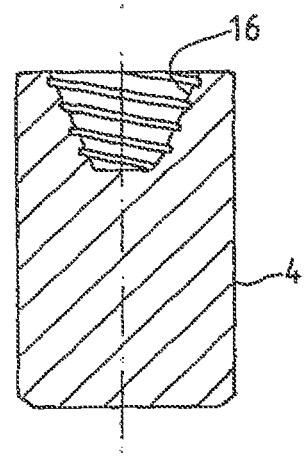

FIG. 1b shows a longitudinal section through a cutting part 5 which is designed identically to the cutting part 5 in FIG. 1a. This cutting part 5 is brazed to an intermediate piece 7 with positive interlocking. For this purpose, a recess 6b, into which a raised driving dog 13a of the intermediate piece 7 projects, is arranged on the underside of the cutting part 5 which faces the intermediate piece 7. The intermediate piece 7 has a thread 15 on its underside which faces the base body 4. A dovetail is also expedient. The intermediate piece 7 is screwed into a matching recess 16 in the base body 4 by means of this thread 15 (see FIG. 1c).

Figure 2A:
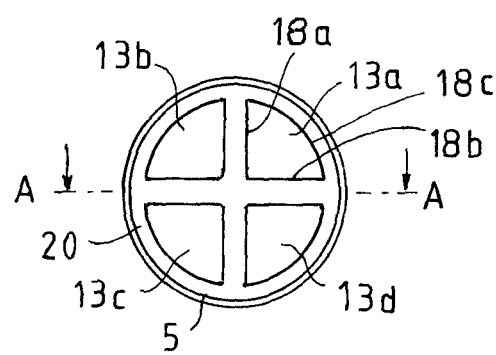
FIG. 2a shows a view from below on a cutting part according to the invention.

FIG. 2a shows a view from below on a cutting part 5 according to the invention with four raised driving dogs 13a, 13b, 13c, 13d, which each have two straight sides 18a, 18b and a curved side 18c. The curved side 18c is matched to the outside wall 20.

Figure 2B:
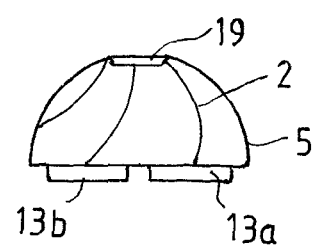
FIG. 2b shows the cutting part according to FIG. 2a in the section a-a.

FIG. 2b shows the cutting part 5 according to FIG. 2a in the section A-A. The raised driving dogs 13a, 13b can be easily seen.

Figure 2C:
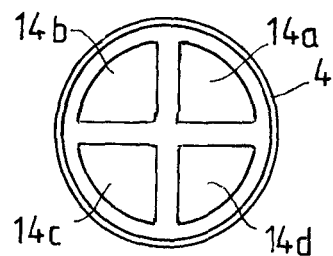
FIG. 2c shows the view on a base body for mounting the cutting part according to FIGS. 1a and 1b.

FIG. 2c shows the view on a base body 4 for mounting the cutting part 5 according to FIGS. 1a, 1b. Four driving dog depressions 14a, 14b, 14c, 14d are arranged on the base body 4 on the top side which faces the cutting part 5. Driving dogs 13a, 13b, 13c, 13d are fitted and brazed into these driving dog depressions 14a, 14b, 14c, 14d.

Figure 3A:
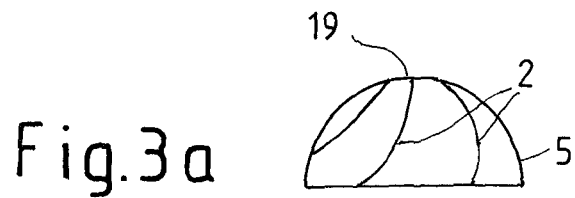
FIG. 3a shows blades which are retracted or recessed in the center or at the pole.

FIG. 3a shows blades 2 which are retracted or recessed in the center or at the pole 19. As a result, the pole 19 of the hemispherical cutting part is flattened or has a flat portion 21.

Figure 3B:
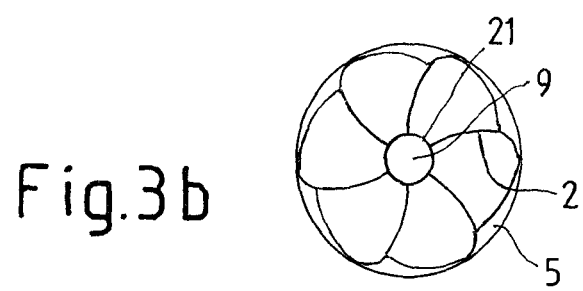
FIG. 3b shows a plan view on a hemispherical cutting part with the blades.

FIG. 3b shows a plan view on a hemispherical cutting part 5 with the blades 2. FIG. 3a shows a section through the cutting part 5 according to FIG. 3b. In this embodiment, six blades 2 are arranged on the cutting part 5. The cutting part 5 has a flat portion 21 at its pole 9, i.e. at this point, all blades 2 in the center or at the pole 9 are retracted or recessed.

Figures 4A, 4B:
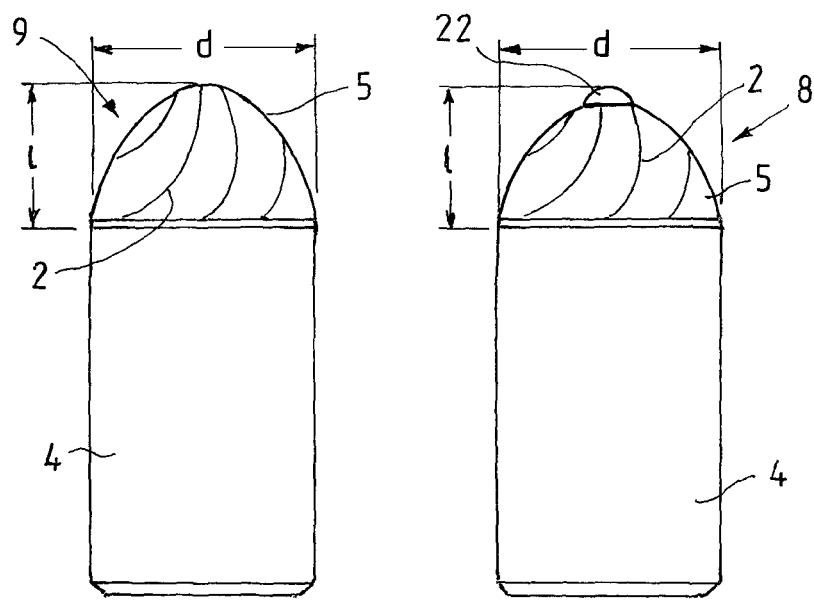
FIG. 4a shows a milling tool with a distorted hemispherical cutting part.
FIG. 4b shows a milling tool with a hemispherical cutting part.
Figure 5:
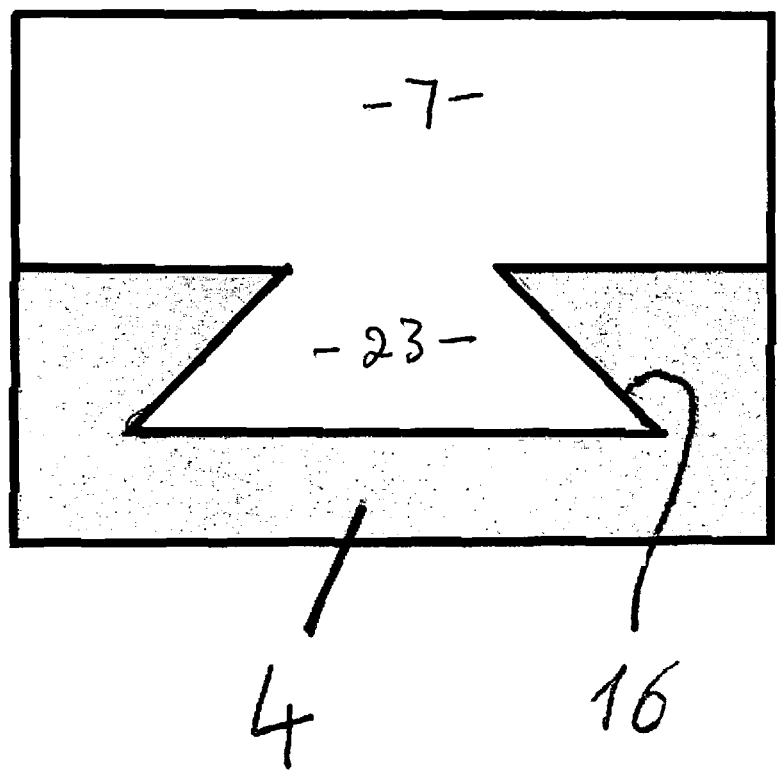
FIG. 5 shows an intermediate piece with a dovetail.

FIG. 4a shows a milling tool 1 with a distorted hemispherical cutting part 5. With this cutting part 5, the length l of the cutting part 5 is greater than d/2. The cutting part 5 is in the form of an ellipse.

FIG. 4b shows a milling tool 1 with a hemispherical cutting part 5. With this cutting part 5, a raised tip 22 is arranged on the pole 19.

Both embodiments have the advantage that material is prevented from being removed at the pole 19 during hard milling. As a result, chips are only formed in areas in which a sufficiently high cutting speed prevails, which guarantees a defined and therefore calculable formation of chips.

It is claimed:

1. A milling tool comprising blades for the milling of workpieces, wherein the milling tool has a length $l_{total}$ and diameter $d_{total}$, wherein said blades are partially or entirely made of polycrystalline cubic boron nitride or polycrystalline diamond and the diameter $d_{total}$ of the milling tool is between 7 mm and 40 mm, wherein the cutting part is joined to the base body by positive interlocking, wherein a recess is arranged on the bottom of the cutting part which faces the base body and on the top of the base body which faces the cutting part, wherein said recesses are arranged in line with one another with respect to the longitudinal axis and, in the assembled state of the cutting part on the base body, form a mounting space in which a driving dog is brazed, and wherein at least one raised driving dog is arranged on the bottom of the cutting part which faces the base body and at least one driving dog depression matched to the driving dog arranged on the top of the base body which faces the cutting part and, in the assembled state of the cutting part on the base body, and wherein the driving dog engages in the driving dog depression and is brazed therein.

2. The milling tool as claimed in claim 1, wherein at least one of the blades is retracted or recessed in the center or at the pole.

3. The milling tool as claimed in claim 2, wherein all blades are retracted or recessed in the center or at the pole.

4. The milling tool as claimed in claim 1, wherein the blades are brazed to the milling tool.

5. The milling tool as claimed in claim 1, wherein the milling tool is formed as one part and, including the blades, is made entirely of PcBN or PCD.

6. The milling tool as claimed in claim 1, wherein the milling tool is formed in several parts with a base body and a cutting part, wherein the base body carries the cutting part directly or by means of an intermediate piece, the cutting part is designed in a hemispherical or distorted hemispherical shape, and the blades are formed in one piece with the cutting part or are brazed to the cutting part.

7. The milling tool as claimed in claim 6, wherein an intermediate piece is arranged between the cutting part and the base body and is joined to the base body and to the cutting part by positive interlocking.

8. The milling tool as claimed in claim 7, wherein on an underside which faces the base body, the intermediate piece has a thread or dovetail by means of which it engages in a matched recess in the base body or vice versa by positive interlocking.

9. The milling tool as claimed in claim 6, wherein the relationship of the axial length (l) and the diameter (d) of the cutting part to one another is such that l>d/2.

10. The milling tool as claimed in claim 1, wherein the relationship of the axial length ($l_{total}$) and the diameter ($d_{total}$) of the milling tool (1) total, to one another is such that $l_{total}/d_{total}>2$.

11. The milling tool as claimed in claim 1, wherein a diameter d of the cutting part is of 7 mm<=d<=14 mm having 4 to 8 blades arranged on the cutting part.

12. The milling tool as claimed in claim 1, wherein a diameter d of the cutting part is of 15 mm<=d<=20 mm having 6 to 12 blades arranged on the cutting part.

13. The milling tool as claimed in claim 1, wherein a diameter d of the cutting part is of 21 mm<=d<=30 mm having 8 to 18 blades arranged on the cutting part.

14. The milling tool as claimed in claim 1, wherein a diameter d of the cutting part is of 31 mm<=d<=40 mm having 10 to 24 blades arranged on the cutting part.

* * * * *